(12) United States Patent
Hopson et al.

(10) Patent No.: US 8,985,604 B2
(45) Date of Patent: Mar. 24, 2015

(54) CROSS AXIS JOINT WITH ELASTOMERIC ISOLATION

(75) Inventors: Steven C Hopson, Saline, MI (US); Steve S Allen, Saline, MI (US); Kanak Soundrapandian, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 12/831,797

(22) Filed: Jul. 7, 2010

(65) Prior Publication Data

US 2012/0007329 A1 Jan. 12, 2012

(51) Int. Cl.
*B60G 7/00* (2006.01)
*F16C 11/06* (2006.01)

(52) U.S. Cl.
CPC ............ *F16C 11/0614* (2013.01); *B60G 7/005* (2013.01); *B60G 2204/416* (2013.01)
USPC ..................... 280/124.134; 403/132; 403/133

(58) Field of Classification Search
USPC .......... 280/124.134, 124.15; 403/26, 76, 114, 403/127, 132, 133
See application file for complete search history.

(56) References Cited

U.S. PATENT DOCUMENTS

| | | | |
|---|---|---|---|
| 3,467,421 A * | 9/1969 | Bentley .......................... 403/203 |
| 3,843,272 A * | 10/1974 | Jorn .............................. 403/132 |
| 4,034,996 A * | 7/1977 | Manita et al. ................. 280/80.1 |
| 4,430,016 A * | 2/1984 | Matsuoka et al. .............. 403/40 |
| 4,765,650 A * | 8/1988 | Kameshima et al. .. 280/124.116 |
| 5,058,867 A | 10/1991 | Hadano et al. ............. 267/141.3 |
| 5,295,670 A * | 3/1994 | Tsukamoto et al. ........ 267/140.5 |
| 5,318,373 A * | 6/1994 | Buhl et al. ..................... 403/134 |
| 5,362,093 A * | 11/1994 | Klosterhuber et al. 280/124.136 |
| 5,374,038 A * | 12/1994 | Hein ........................... 267/140.5 |
| 5,556,119 A | 9/1996 | Buchner et al. .............. 280/96.1 |
| 5,845,926 A | 12/1998 | Davis et al. .................... 280/690 |
| 5,902,050 A | 5/1999 | Balczun et al. ................ 384/206 |
| 6,056,498 A * | 5/2000 | Velinsky et al. .............. 414/555 |
| 6,113,302 A * | 9/2000 | Buhl .............................. 403/133 |
| 6,145,858 A * | 11/2000 | Foulquier ................. 280/124.13 |
| 6,216,833 B1 * | 4/2001 | Lefferts et al. ................ 188/380 |
| 6,231,062 B1 * | 5/2001 | Sutton .................... 280/124.146 |
| 6,341,915 B1 * | 1/2002 | Kammel ....................... 403/135 |
| 6,386,553 B2 * | 5/2002 | Zetterstrom ................. 280/5.51 |
| 6,435,491 B1 * | 8/2002 | Blondelet et al. ............. 267/279 |
| 6,446,993 B1 | 9/2002 | Huszarik et al. ........ 280/124.177 |
| 6,575,441 B2 * | 6/2003 | Lefebvre ....................... 267/281 |
| 6,845,994 B2 * | 1/2005 | Cai et al. ................. 280/124.107 |
| 6,854,750 B2 * | 2/2005 | Carlstedt et al. ........ 280/124.169 |
| 7,017,890 B2 * | 3/2006 | Rechtien ..................... 267/141.3 |
| 7,052,002 B2 * | 5/2006 | Imaeda et al. ............ 267/140.12 |
| 7,165,909 B2 * | 1/2007 | Buhl et al. ..................... 403/132 |
| 7,168,879 B2 * | 1/2007 | Bertram et al. ............... 403/135 |
| 7,438,493 B2 | 10/2008 | Holmes et al. ................ 403/134 |

(Continued)

FOREIGN PATENT DOCUMENTS

| | | | |
|---|---|---|---|
| DE | 3906079 | 2/1989 | .............. F16C 11/08 |
| WO | WO 2008/074063 A1 | 12/2007 | .............. F16C 11/06 |
| WO | WO 2010/085934 A1 | 1/2010 | .............. B60G 7/00 |

*Primary Examiner* — Paul N Dickson
*Assistant Examiner* — Barry Gooden, Jr.
(74) *Attorney, Agent, or Firm* — L.C. Begin & Associates, PLLC

(57) ABSTRACT

A front lower control arm assembly includes a front lower control arm and a bushing attached to the arm. The bushing has a first central axis. A ball joint is also attached to the arm. The ball joint has a second central axis oriented substantially perpendicularly to a plane including the first central axis.

9 Claims, 3 Drawing Sheets

(56) References Cited

U.S. PATENT DOCUMENTS

| | | | |
|---|---|---|---|
| 8,033,557 B2* | 10/2011 | Dundon | 280/124.134 |
| 8,770,884 B2* | 7/2014 | Erdogan et al. | 403/147 |
| 2002/0076268 A1* | 6/2002 | Paduano | 403/149 |
| 2003/0111818 A1* | 6/2003 | Carlstedt et al. | 280/124.169 |
| 2003/0152420 A1* | 8/2003 | Broker | 403/135 |
| 2004/0075234 A1* | 4/2004 | Seksaria et al. | 280/124.134 |
| 2004/0113337 A1* | 6/2004 | Landry, Jr. | 267/141 |
| 2004/0201196 A1* | 10/2004 | Katagiri et al. | 280/124.134 |
| 2005/0051987 A1* | 3/2005 | Saitoh et al. | 280/124.134 |
| 2005/0191120 A1* | 9/2005 | Oellers | 403/133 |
| 2006/0151970 A1* | 7/2006 | Kaminski et al. | 280/124.134 |
| 2006/0171775 A1* | 8/2006 | McLaughlin et al. | 403/122 |
| 2008/0084043 A1* | 4/2008 | Dundon | 280/124.125 |

\* cited by examiner

CROSS AXIS JOINT WITH ELASTOMERIC ISOLATION

BACKGROUND OF THE INVENTION

The embodiments of the present invention relate to ball joints usable for connecting a lower control arm to a sub-frame of a vehicle.

SUMMARY OF THE INVENTION

In one aspect of the embodiments of the present invention, a front lower control arm assembly is provided including a front lower control arm and a bushing attached to the arm. The bushing has a first central axis. A ball joint is also attached to the arm. The ball joint has a second central axis oriented substantially perpendicularly to a plane including the first central axis.

In another aspect of the embodiments of the present invention, a vehicle is provided including a front lower control arm coupled to a vehicle sub-frame. The arm has a portion configured for attachment to a vehicle knuckle. A ball joint couples the arm to the sub-frame. The ball joint is positioned substantially laterally of the knuckle attachment portion. The joint has a central axis oriented substantially perpendicularly to an axis of rotation of the arm with respect to the sub-frame.

In another aspect of the embodiments of the present invention, a ball joint is provided including a mounting portion defining an opening therein, and a central portion positioned within the opening. An elastomeric portion is interposed between the mounting portion and the central portion to secure the central portion within the opening. At least one void is formed in the elastomeric portion.

BRIEF DESCRIPTION OF THE DRAWINGS

In the drawings illustrating embodiments of the present invention:

FIG. 5 is a cross-sectional side view of a ball joint in accordance with another embodiment of the present invention.

DETAILED DESCRIPTION

Figure 1:
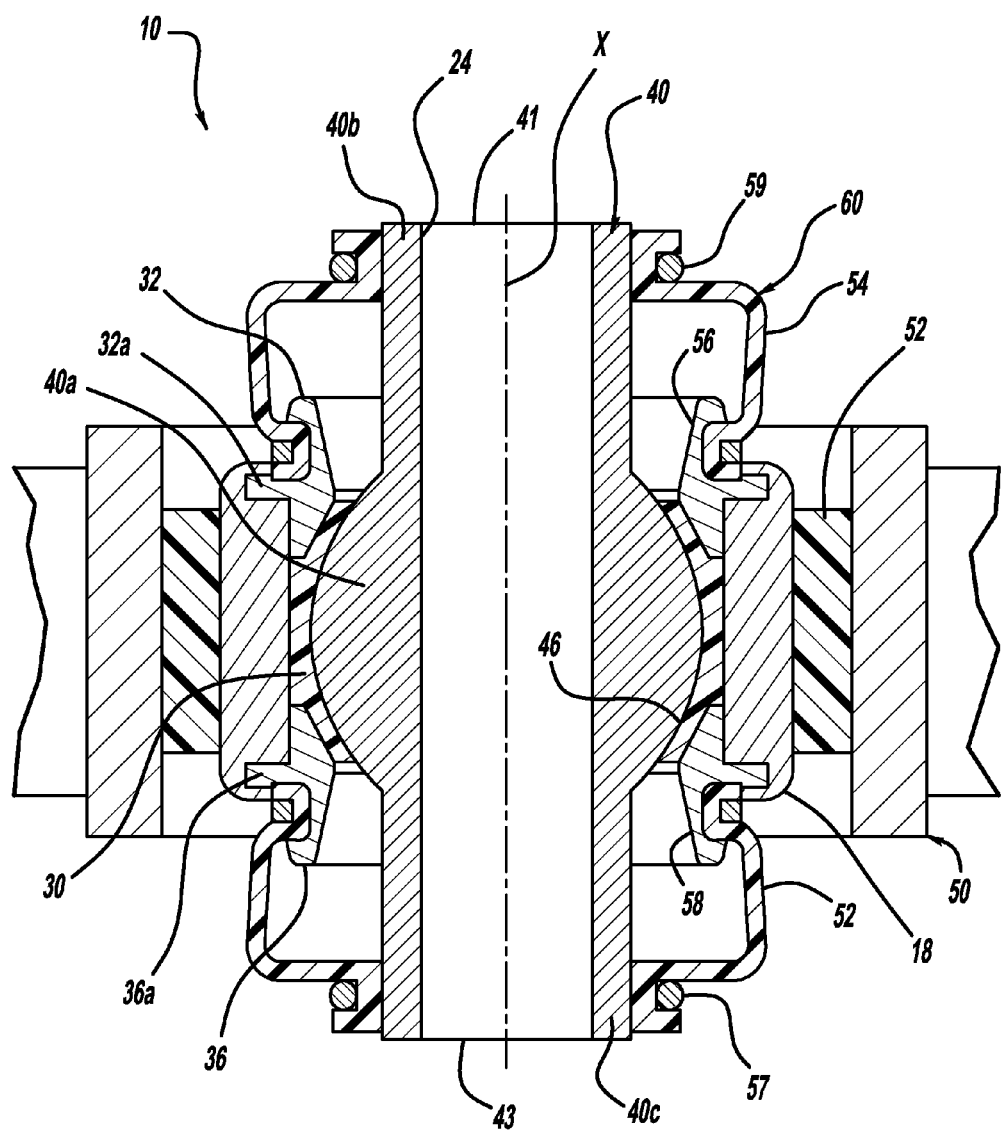
FIG. 1 is a cross-sectional side view of a ball joint in accordance with one embodiment of the present invention.

FIGS. 1-4 show a ball joint 10 and a front lower control arm sub-assembly incorporating a ball joint in accordance with one embodiment of the present invention.

In the embodiment shown in FIGS. 1-4, ball joint 10 is mounted on a front lower control arm 14 of an independent suspension of a vehicle. The joint 10 is mounted substantially laterally of the portion 14k of the control arm at which the wheel knuckle (not shown) is attached, and connects the front lower control arm 14 to the vehicle sub-frame 16. In the attachment position shown in FIG. 1, joint 10 is configured so as to have a relatively high stiffness responsive to lateral loads. This enhances vehicle handling characteristics.

In this embodiment, ball joint 10 is employed as a cross axis joint designed to carry loads in a radial direction and to transfer the loads from the front lower control arm 14 to the vehicle sub-frame 16. Ball joint 10 is secured in an opening 20 formed in the lower control arm 14. Sub-frame 16 has an opening 22 formed therein for receiving a bolt or other suitable member (not shown) therethrough for connecting the ball joint 10 to the sub-frame. The connecting member passes through an opening 24 of the ball joint 10. A bushing 100 or other suitable mechanism may be used to connect another portion of the front lower control arm to another portion of the sub-frame.

In the embodiment shown in FIGS. 1-4, the ball joint 10 has central portion (generally designated 60), an elastomeric portion 52, and a mounting portion 50. Central portion 60 may comprise (or be constructed as) a conventional ball joint or swivel joint. The following description sets forth an exemplary structure for the central portion 60 that is not intended to be limiting. However, any alternative construction of central portion 60 should be adaptable to elastomeric isolation from and within a mounting portion as described herein.

Referring to FIG. 1, central portion 60 includes an annular housing 18. Housing 18 may be metallic or may be formed from any suitable material. Housing 18 supports a bearing shell 30 in a cavity formed in the housing. The bearing shell 30 is secured in place within housing 18 by a first ring 32 positioned on a first side of the bearing shell and a second ring 36 positioned on a second side of the bearing shell opposite the first side. The rings 36 and 38 are held in position by deformation of the material forming the ends of housing 18. The housing material is deformed over flanges 32a and 36a formed along respective ones of rings 32 and 36, so as to enclose the flanges and secure the rings to the housing 18.

A ball sleeve 40 is secured within the bearing shell 30. Ball sleeve 40 has a generally spherical center 40a and a pair of projecting portions 40b and 40c extending from opposite sides of center 40a. Center 40a has a ball sleeve bearing surface 46 in contact with the bearing shell 30. Inner through opening 24 extends through projecting portion 40b, center 40a, and projecting portion 40c. The ball sleeve 40 also has a first end face 41 and a second end face 43.

As shown in FIG. 1, the rings 32 and 36 each define a seat to receive an end of a respective sealing member 54 or 52. Sealing member 52 has an end 56 seated in the seat formed in ring 32. End 56 is secured in this seat by a clamping element 59. Sealing member 52 has an end 58 seated in the seat formed in ring 36. End 58 is secured in this seat by a clamping element 57.

All of the components described above may be formed from any material or materials suitable for their intended uses.

In the embodiment shown in FIGS. 1-4, mounting portion 50 comprises a ring radially spaced apart from housing 18. Mounting portion 50 is used for mounting the ball joint 10 in an opening formed in front lower control arm 14, using an interference fit or any other suitable mounting method. Mounting portion 50 may be metallic or may be formed from any suitable material.

Referring to FIGS. 1-4, elastomeric portion 52 comprises an elastomeric material interposed between central portion 60 and mounting portion 50, to provide a resilient interface between the central portion and the mounting portion. In a particular embodiment, the elastomeric material joins an outer surface 18a of housing 18 to an inner surface 50a of mounting portion 50. Elastomeric material 52 may be a rubber compound or any other material suitable for the uses described herein. In a particular embodiment, elastomeric portion 52 comprises an elastomeric bushing seated and secured between central portion 60 and mounting portion 50.

Figure 2:
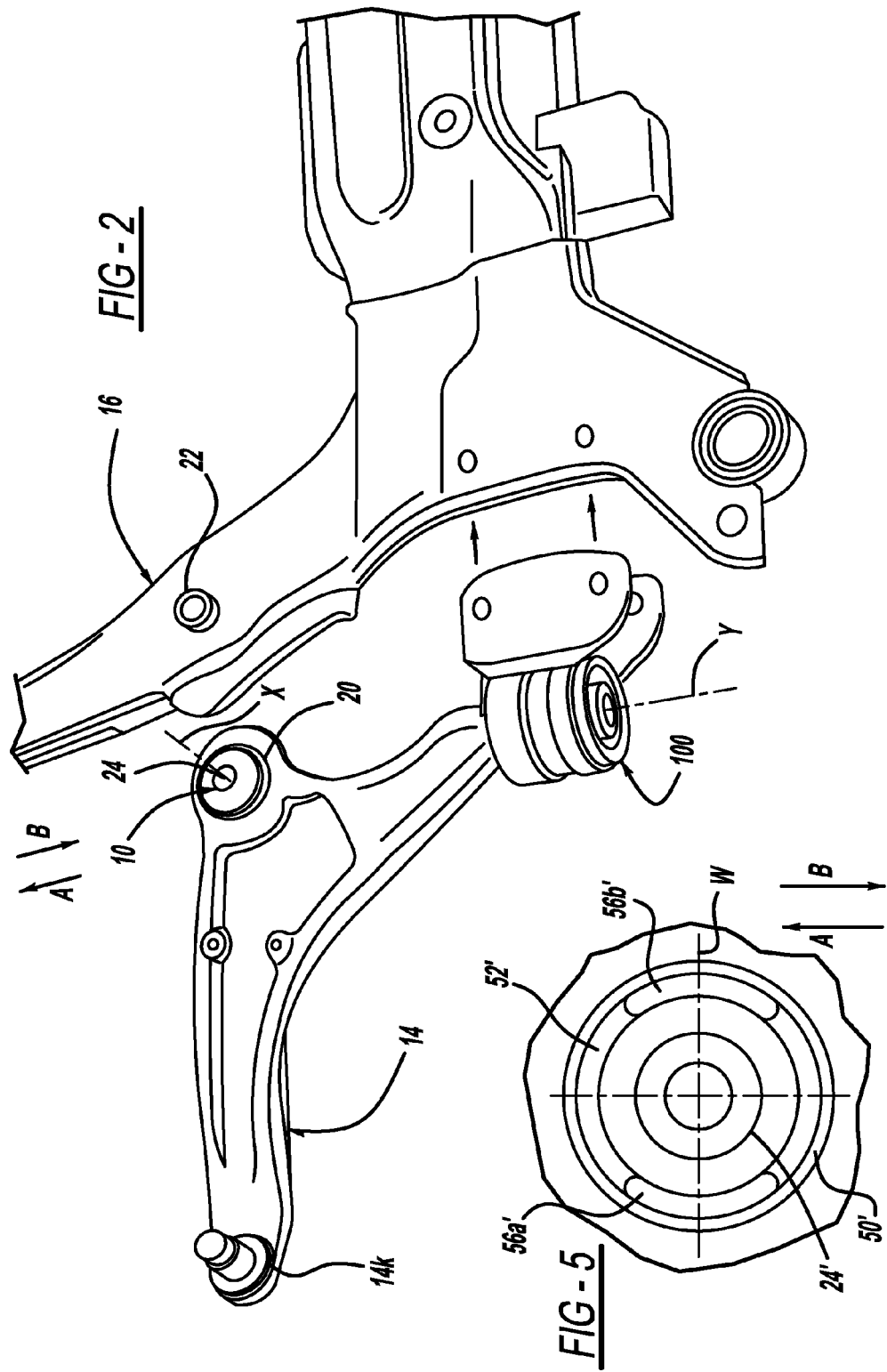
FIG. 2 is an exploded view of a sub-assembly including a vehicle sub-frame and a front lower control arm sub-assembly incorporating a ball joint in accordance with one embodiment of the present invention.

In the embodiment shown in FIG. 2, a front lower control arm assembly is formed in which the ball joint 10 has a cross-axis orientation wherein the central axis X of the joint 10 is oriented substantially perpendicularly to a plane including a central axis Y of bushing 100, rather than substantially parallel to the central axis of the bushing 100. Central axis X is also oriented substantially perpendicularly to an axis of rotation of the front lower control arm 14 with respect to vehicle sub-frame 16 during up and down motion of a vehicle wheel (not shown) attached to the control arm. In the embodiment shown in FIG. 2, axis X is also oriented substantially vertically or substantially perpendicular to a horizontal plane. Central axis X is also oriented substantially perpendicularly to a plane including a longitudinal or fore-aft axis of the vehicle (not shown).

Compared to a conventional bushing having an axis oriented substantially parallel to the axis of bushing 100, the orientation of ball joint 10 shown in FIG. 2 provides a very low joint rotational rate in response to up-and-down wheel motion. This low rotational rate enhances ride quality. In addition, the elastomeric material interposed between central portion 60 and mounting portion 50 provides a relatively high lateral stiffness responsive to loading, which enhances vehicle handling characteristics. The elastomeric material also attenuates the transmission of noise, vibration, and harshness from the vehicle wheel to the vehicle frame.

The orientation of the joint central axis X described above also provides a package that is relatively compact and which can be nested in the sub-frame and attached thereto.

Figure 4:
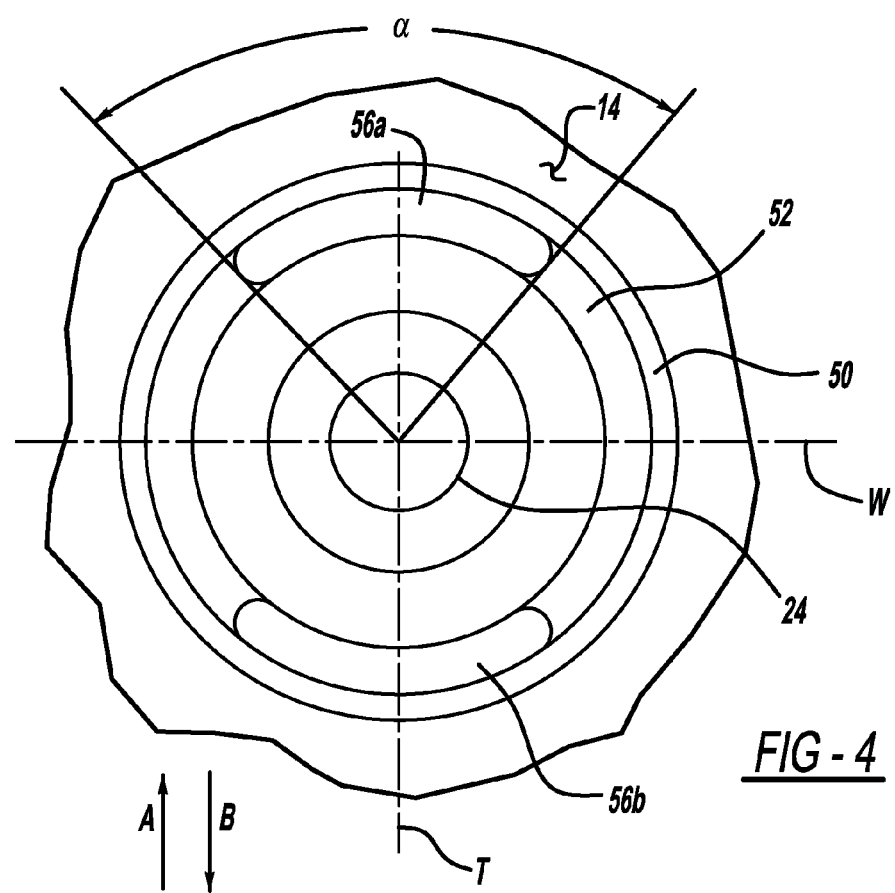
FIG. 4 is a magnified view of a portion of the lower control arm sub-assembly shown in FIG. 3 showing the ball joint of FIG. 1.

In a particular embodiment, gaps or voids 56a and 56b are provided in the elastomeric material 52 along opposite sides of the housing 18. In one embodiment, the voids 56a and 56b are positioned generally along an axis T extending substantially parallel with a longitudinal or fore-aft axis of the vehicle. This positioning enables central portion 60 to shift slightly responsive to loads or load components acting along or parallel to the vehicle fore-aft axis. For example, when a force acting in the general direction indicated by arrow A (FIG. 4) acts on ball joint 10, void 56a provides less resistance to motion of central portion 60 in direction A than the elastomeric material would. Similarly, due to void 56b, elastomeric material that would otherwise resist motion of central portion 60 in direction A is not present. The principle just described applies equally to forces acting in the general direction of arrow B of FIG. 4. Thus, voids 56a and 56b provide relatively lower stiffness regions which permit central portion 60 to move slightly into voids 56a and 56b toward mounting portion 50 responsive to longitudinal loading (i.e., loading acting along or substantially parallel to the vehicle fore-aft axis). As seen in FIG. 4, each of voids 56a and 56b extends along a predetermined arc length α. In one particular embodiment, voids 56a and 56b have substantially equal arc lengths. Each of voids 56a and 56b has an arc length in the range of about 45 degrees to about 90 degrees. In a particular embodiment, voids 56a and 56b have arc lengths equal to about 60 degrees.

In one embodiment, one or more of the voids 56a and 56b extend from the mounting portion to the central portion.

It is believed that the relative stiffness and response to loading of ball joint 10 may be affected by controlling the amount of elastomeric material, the type of elastomeric material, and the arrangement of elastomeric material in the annular region between central portion 60 and mounting portion 50. For example, if the positions of voids 56a and 56b are shifted approximately 90 degrees (as shown in FIG. 5), voids 56a and 56b would provide relatively lower stiffness regions which permit central portion 60 to move slightly into the voids toward mounting portion 50 responsive to lateral loading (i.e., loading acting substantially perpendicular to the vehicle fore-aft axis), rather than longitudinal loading.

Also, the relative stiffness of the ball joint may be increased by reducing the void size or the arc length of the void. This has the effect of adding more elastomeric material, thus increasing the resistance to motion of central portion 60 relative to mounting portion 50. Conversely, the relative stiffness of the ball joint may be decreased by increasing the void size or the arc length of the void. This has the effect of removing elastomeric material, thus decreasing the resistance to motion of central portion 60 relative to mounting portion 50.

Also, the relative stiffness of the ball joint may be increased by substituting an elastomeric material having a relatively higher elastic modulus, which provides relatively greater resistance to forces acting on the central portion 60. Conversely, the relative stiffness of the ball joint may be decreased by substituting an elastomeric material having a relatively lower elastic modulus, which provides relatively lower resistance to forces acting on the central portion 60.

Figure 3:
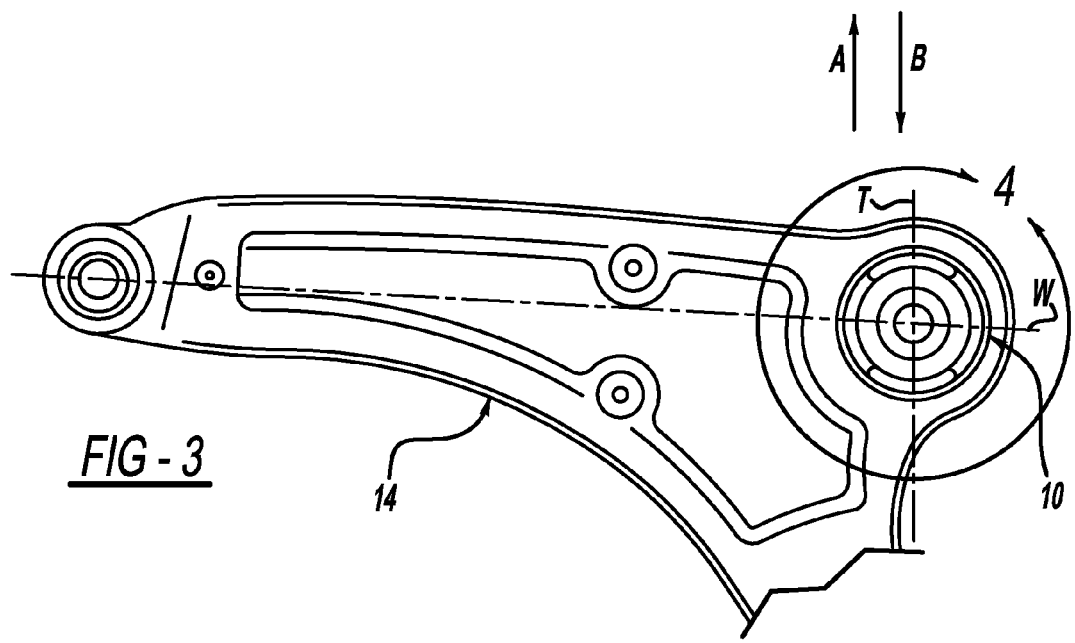
FIG. 3 is a plan view of the lower control arm sub-assembly shown in FIG. 2.

Also, the amount of elastomeric material, the type of elastomeric material, and the arrangement of elastomeric material in the annular region between central portion 60 and mounting portion 50 may be varied to affect the relative stiffness and response of the joint to up and down motion of the vehicle wheels. For example, it is believed that the positioning of elastomeric material 52 along an axis W extending from the ball joint center to the vehicle wheel (as shown in FIGS. 3 and 4) will provide a greater relative stiffness of the ball joint responsive to up and down motion of the wheels than a distribution of elastomeric material in which voids 56a and 56b are disposed along axis W (as shown in FIG. 5). It is also believed that varying the total amount of elastomeric material and the pertinent elastomeric material properties as previously described will affect the stiffness and response of the ball joint to up and down motion of the vehicle wheels.

In the manner described above, suitable variation of the amount of elastomeric material, the type of elastomeric material, and the arrangement of elastomeric material provides a method of "tuning" the dynamic response of the ball joint to applied loads.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A ball joint structure comprising:
   a mounting portion defining an opening therein;
   a central portion positioned within the opening;
   a first quantity of elastomeric material extending uninterrupted from the mounting portion to the central portion;
   a second quantity of elastomeric material extending uninterrupted from the mounting portion to the central portion;
   a first void separating the first and second quantities of elastomeric material and extending uninterrupted from the mounting portion to the central portion; and
   a second void separating the first and second quantities of elastomeric material and extending uninterrupted from the mounting portion to the central portion,
   wherein the first void is in direct contact with both the first and second quantities of elastomeric material, and the second void is in direct contact with both the first and second quantities of elastomeric material.

2. The ball joint structure of claim 1 wherein the first and second voids are positioned on a single axis extending through a central axis of the central portion, and wherein the single axis is structured to extend substantially parallel with a fore-aft axis of a vehicle when the ball joint structure is installed in the vehicle.

3. The ball joint structure of claim 1 wherein the first void is positioned along a first side of the central portion and the second void is positioned diametrically opposite the first void along a second side of the central portion opposite the first side.

4. A vehicle including a ball joint structure in accordance with claim 1.

5. The ball joint structure of claim 1 wherein the first void extends along an arc length of 60 degrees.

6. The ball joint structure of claim 5 wherein the second void extends along an arc length of 60 degrees.

7. A control arm assembly comprising:
   a front lower control arm; and
   a ball joint structure in accordance with claim 1 attached to the arm.

8. A vehicle including a control arm assembly in accordance with claim 7.

9. The vehicle of claim 8 wherein the first and second voids are positioned on a single axis extending through a central axis of the central portion, and wherein the single axis extends substantially parallel with a fore-aft axis of the vehicle.

* * * * *